US006613426B2

(12) United States Patent
Onozawa et al.

(10) Patent No.: US 6,613,426 B2
(45) Date of Patent: Sep. 2, 2003

(54) VERY FINE ANTI-GLARE HARD COAT FILM

(75) Inventors: Yutaka Onozawa, Kawagoe (JP); Shigenobu Maruoka, Saitama (JP); Satoru Shoshi, Koshigaya (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/873,865

(22) Filed: Jun. 4, 2001

(65) Prior Publication Data

US 2002/0028328 A1 Mar. 7, 2002

(30) Foreign Application Priority Data

Jul. 21, 2000 (JP) .......................................... 2000-220427

(51) Int. Cl.⁷ ............................. B32B 5/16; B32B 7/12; B32B 27/06; B32B 27/00
(52) U.S. Cl. ...................... 428/323; 428/328; 428/331; 428/343; 428/354; 428/483; 428/500
(58) Field of Search ................................ 428/323, 328, 428/329, 331, 332, 343, 411.1, 908.8, 345, 354, 483, 480, 500

(56) References Cited

U.S. PATENT DOCUMENTS 6,103,370 A * 8/2000 Onozawa et al. ........... 428/354
6,329,041 B1 * 12/2001 Tsuchiya et al. ............ 428/195
6,358,601 B1 * 3/2002 Bilkadi ....................... 428/323

FOREIGN PATENT DOCUMENTS

| JP | 10-231444 A | 9/1998 |
| JP | 11-286083 A | 10/1999 |

* cited by examiner

*Primary Examiner*—Paul Thibodeau
*Assistant Examiner*—Sheeba Ahmed
(74) *Attorney, Agent, or Firm*—Frishauf, Holtz, Goodman & Chick, P.C.

(57) ABSTRACT

A very fine anti-glare hard coat film which comprises a base film and a hard coat layer disposed on the base film and has a haze of 3% or greater, wherein the hard coat layer comprises (A) a resin cured by an ionizing radiation and, per 100 parts by weight of the resin, 2 to 25 parts by weight of (B) silica particles having an average diameter of 0.5 to 5 $\mu$m and 10 to 200 parts by weight of (C) fine particles having an average diameter of 1 to 60 nm.

The very fine anti-glare hard coat film provides excellent visibility when the film is used for various types of displays since the film provides an excellent anti-glare property to the displays such as very fine liquid crystal displays without deterioration in the quality of displayed images.

16 Claims, No Drawings

VERY FINE ANTI-GLARE HARD COAT FILM

BACKGROUND OF THE INVENTION

1. Field of the Invention

The present invention relates to a very fine anti-glare hard coat film and, more particularly, to a very fine anti-glare hard coat film which provides excellent visibility when the film is used for various types of displays since the film provides an excellent anti-glare property to the displays such as very fine liquid crystal displays without deterioration in the quality of displayed images and can also be used as a film for protecting surfaces since the film has a great surface hardness.

2. Description of Related Art

Liquid crystal displays used for displaying images are recently becoming very fine so that quality of images is further improved. Due to this tendency of becoming very fine, it is required that components used for liquid crystal displays have a sufficient high quality. Specific examples of such components include anti-glare hard coat films.

When a display such as a CRT or a liquid crystal display is used, light from the outside is occasionally reflected at the surface of the display (so-called glare) and difficulty arises in watching images on the display. In particular, as the size of flat panel displays increases recently, solving the above problem is becoming more important.

To solve the above problem, various methods for preventing glare (anti-glare methods) have been used for various types of display. In an example of such methods for preventing glare, roughness is formed on the surface of hard coat films used for polarizing plates in liquid crystal displays and protective hard coat films for various types of display. The anti-glare methods for hard coat films can generally be divided into (1) methods in which roughness is formed on the surface of a hard coat film by a physical means during curing for forming a hard coat layer and (2) methods in which a filler is mixed into a hard coat material which is used for forming a hard coat layer.

Between these two types of method, the latter method in which a filler is mixed into a hard coat material is mainly used and silica particles are mainly used as the filler. Silica particles are used because whiteness of the obtained hard coat film is low and dispersion is excellent when silica particles are mixed into a hard coat material.

However, when the liquid crystal display is very fine, using a conventional anti-glare hard coat film which is not very fine (which has a rough feel) as the anti-glare hard coat film causes a problem in that the quality of images inevitably deteriorates even when the liquid crystal display itself is very fine. Therefore, it is necessary that a very fine anti-glare hard coat film should be used for achieving the high quality of images which should be obtained by the very fine liquid crystal display.

In conventional anti-glare hard coat films, in general, silica particles having an average diameter of 1 to 2.5 $\mu$m have been used. Although these silica particles provide an excellent anti-glare property, the silica particles cannot satisfy the requirements of recent liquid crystal displays which are becoming very fine and the quality of images is held poor.

As described above, it is the actual present situation that no anti-glare hard coat films which can provide the excellent anti-glare property to recent very fine liquid crystal displays without causing deterioration in the quality of images are found among anti-glare hard coat films using silica particles having an average diameter of 1 to 2.5 $\mu$m singly as the filler.

Methods (1) described above in which the roughness is formed by a physical means during curing of a hard coat layer have drawbacks in that the operation of forming the roughness is complicated and that this methods cause insufficient visibility similarly to the method described above.

SUMMARY OF THE INVENTION

The present invention has an object of providing a very fine anti-glare hard coat film which provides an excellent anti-glare property to displays such as very fine liquid crystal displays without deterioration in the quality of displayed images and, therefore, excellent visibility when the film is used for various types of displays and can also be used as a film for protecting surfaces.

As the result of extensive studies by the present inventors to develop a very fine anti-glare hard coat film having the above excellent functions, it was found that the object can be achieved by a very fine anti-glare hard coat film which comprises a hard coat layer comprising a resin cured by an ionizing radiation and, in specific amounts, silica particles having an average diameter of 0.5 to 5 $\mu$m and fine particles having an average diameter of 1 to 60 nm and has a haze of a specific value or greater. The present invention has been completed based on the knowledge.

The present invention provides:

(1) A very fine anti-glare hard coat film which comprises a base film and a hard coat layer disposed on the base film and has a haze of 3% or greater, wherein the hard coat layer comprises (A) a resin cured by an ionizing radiation and, per 100 parts by weight of the resin, 2 to 25 parts by weight of (B) silica particles having an average diameter of 0.5 to 5 $\mu$m and 10 to 200 parts by weight of (C) fine particles having an average diameter of 1 to 60 nm;

(2) A film described in (1), which has a 60° gloss of 100 or smaller;

(3) A film described in any of (1) and (2), which has a clarity of vision through of 100 or greater;

(4) A film described in any of (1) to (3), which has a total light transmittance of 70% or greater;

(5) A film described in any of (1) to (4), which comprises a layer for preventing reflection disposed on the hard coat layer; and (6) A film described in any of (1) to (5), which comprises an adhesive layer disposed on a face of the base film opposite to a face on which the hard coat layer is disposed.

DESCRIPTION OF THE PREFERRED EMBODIMENTS

The base film in the very fine anti-glare hard coat film of the present invention is not particularly limited and a suitable plastic film can be selected from conventional plastic films which are used as the base film in optical hard coat films. Examples of the plastic film include films of polyesters, such as polyethylene terephthalate, polybutylene terephthalate, and polyethylene naphthalate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, polyimide films, fluororesin films, polyamide films and acrylic resin films.

The base film may be transparent or translucent and may be colored or colorless. These properties can be suitably selected in accordance with the application. For example, when the hard coat film is used as a protective film of a liquid crystal display, a colorless transparent film is preferable as the base film.

The thickness of the base film is not particularly limited and suitably selected in accordance with the situation. The thickness is generally in the range of 15 to 250 $\mu$m and preferably in the range of 30 to 200 $\mu$m. One or both surfaces of the base film may be treated, for example, by oxidation or by a treatment of forming rough surfaces, where desired, so that adhesion with layers disposed on the surfaces is enhanced. Examples of the treatment of the surface by oxidation include the treatment by corona discharge, the treatment by chromic acid (a wet process), the treatment by flame, the treatment by heated air or irradiation by ultraviolet light in the presence of ozone. Examples of the treatment of forming rough surfaces include the treatment by sand blasting and the treatment with a solvent. The surface treatment is suitably selected in accordance with the type of the base film. In general, the treatment by corona discharge is preferable from the standpoint of the effect and the operability.

The very fine anti-glare hard coat film of the present invention comprises the base film described above and a hard coat layer disposed on the base film. The hard coat layer comprises (A) a resin cured by an ionizing radiation and (B) silica particles and (C) fine particles which are uniformly dispersed in component (A).

The hard coat layer can be formed by coating the base film with a coating fluid for forming a hard coat layer which comprises a compound curable by an ionizing radiation used for forming component (A), the silica particles of component (B), the fine particles of component (C) and, where desired, a photopolymerization initiator so that a coating layer is formed, followed by curing the coating layer by irradiation by the ionizing radiation.

As the above compound curable by an ionizing radiation used for forming component (A), at least one compound selected from photopolymerizable prepolymers and photopolymerizable monomers can be used. The photopolymerizable prepolymer include prepolymers of the radical polymerization type and prepolymers of the cationic polymerization type. Examples of the prepolymer of the radical polymerization type include prepolymers of polyester acrylates, epoxyacrylates, urethane acrylates and polyol acrylates. The prepolymer of a polyester acrylate can be obtained, for example, by obtaining a polyester oligomer having hydroxyl groups at the ends by condensation of a polyfunctional carboxylic acid and a polyhydric alcohol, followed by esterification of the hydroxyl groups in the obtained oligomer with (meth)acrylic acid; or by obtaining an oligomer having hydroxyl groups at the ends by addition of an alkylene oxide to a polyfunctional carboxylic acid, followed by esterification of the hydroxyl groups of the obtained oligomer with (meth)acrylic acid. The prepolymer of epoxyacrylate can be obtained, for example, by esterification of oxirane rings in an epoxy resin of a bisphenol type or a novolak type having a relatively low molecular weight by the reaction with (meth)acrylic acid. The prepolymer of urethane acrylate can be obtained, for example, by obtaining a polyurethane oligomer by the reaction of a polyether polyol or a polyester polyol with a polyisocyanate, followed by esterification of the obtained oligomer with (meth)acrylic acid. The prepolymer of polyol acrylate can be obtained, for example, by esterification of hydroxyl groups in a polyether polyol with (meth)acrylic acid. The above photopolymerizable prepolymers may be used singly or in combination of two or more.

As the photopolymerizable prepolymer of the cationic polymerization type, in general, epoxy resins are used. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerizable monomer include polyfunctional acrylates such as 1,4-butanediol di(meth) acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth) acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri-(meth)acrylate, dipentaerythritol tri(meth) acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta (meth)acrylate modified with propionic acid, dipentaerythritol hexa(meth)acrylate and dipentaerythritol hexa(meth) acrylate modified with caprolactone. The above photopolymerizable monomers may be used singly or in combination of two or more. The photopolymerizable monomer may be used in combination with the photopolymerizable prepolymer described above.

Examples of the photopolymerization initiator for the photo-polymerizable prepolymers and the photopolymerizable monomers of the radical polymerization type, which is used where desired, include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholino-propane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methyl-anthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoates. Examples of the photopolymerization initiator for the photopolymerizable prepolymers of the cationic polymerization type include compounds composed of oniums such as aromatic sulfonium ions, aromatic oxosulfonium ions and aromatic iodonium ions and anions such as tetrafluoroborates, hexafluorophosphates, hexafluoroantimonates and hexafluoroarsenates. The above photopolymerization initiators may be used singly or in combination of two or more. The amount is generally selected in the range of 0.2 to 10 parts by weight per 100 parts by weight of the photopolymerizable prepolymer, the photopolymerizable monomer or the both compounds.

As the silica particles of component (B), silica particles having an average diameter of 0.5 to 5 $\mu$m are used. When the average diameter of the particles is smaller than 0.5 $\mu$m, secondary agglomeration tends to take place. When the average diameter exceeds 5 μm, the surface of the hard coat layer becomes rough and the visibility deteriorates. Therefore, when the average diameter is outside the above range, the object of the present invention cannot be achieved. From the standpoint of preventing secondary agglomeration and the visibility, it is preferable that the average diameter of the particles is in the range of 0.8 to 4 μm and more preferably in the range of 1 to 3 μm.

The silica particles are used in an amount of 2 to 25 parts by weight per 100 parts by weight of the compound curable by irradiation by an ionizing radiation described above. When the amount is less than 2 parts by weight, the 60° gloss exceeds 100 and a sufficient anti-glare property cannot be obtained. When the amount exceeds 25 parts by weight, the clarity of vision through is smaller than 100 and the quality of displayed images deteriorates. From the standpoint of the anti-glare property and the prevention of deterioration in the quality of displayed images, it is preferable that the amount of the silica particles is in the range of 2.5 to 20 parts by weight and more preferably in the range of 3 to 15 parts by weight.

As the fine particles of component (C), fine particles having an average diameter in the range of 1 to 60 nm are used. When the silica particles described above are used alone in a manner used in the conventional processes, a problem arises in that, although the excellent anti-glare property can be exhibited, it is inevitable that the clarity of vision through is poor and the quality of displayed images deteriorates.

The fine particles of component (C) exhibit the effect of maintaining the excellent anti-glare property of the silica particles, suppressing deterioration in the quality of displayed images by improving the clarity of vision through and, moreover, improving the antistatic property by decreasing the surface resistivity of the hard coat layer when some types of the fine particles are used. When the average particle diameter of the fine particles is outside the above range, the above effect is not sufficiently exhibited. From the standpoint of the above effect, it is preferable that the average diameter of the fine particles is in the range of 5 to 50 nm and more preferably in the range of 10 to 30 nm.

The fine particles of component (C) may be an oxide comprising a single metal or composite oxides comprising at least two types of metals. Examples of the fine particles include fine particles of an oxide of a single metal such as $Al_2O_3$, $TiO_2$, $Fe_2O_3$, ZnO, $CeO_2$, $Y_2O_3$, $SiO_2$, MgO, $ZrO_2$, PbO, $SnO_2$, $Ho_2O_3$, SrO, $Bi_2O_3$, $Nd_2O_3$, $Sb_2O_3$, $In_2O_3$, and $Yb_2O_3$; and fine particles of composite oxides of metals such as $Al_2O_3$/MgO, $BaTiO_3$, $Y_2O_3$/Eu and zinc antimonate. Among these fine particles, fine particles of zinc antimonate and fine particles of $SiO_2$ are preferable. The fine particles of zinc antimonate are commercially available in the form of a sol as products of the CELNAX (a trade name) series manufactured by NISSAN CHEMICAL INDUSTRIES, Ltd. and can be easily obtained. The fine particles of $SiO_2$ are commercially available in the form of a sol as products of the OSCAL (a trade name) series manufactured by CATALYSTS & CHEMICALS IND. Co., Ltd. and can be easily obtained. The fine particles may be used singly or in combination of two or more.

The fine particles of component (C) is used in an amount in the range of 10 to 200 parts by weight per 100 parts by weight of the above compound curable by irradiation by an ionizing radiation. When the above amount is less than 10 parts by weight, the clarity of vision through is smaller than 100 and the effect of suppressing deterioration in the quality of displayed images is not sufficiently exhibited. When the amount exceeds 200 parts by weight, the total light transmittance is smaller than 70% and the transparency deteriorates. From the standpoint of the clarity of vision through and the total light transmittance, it is preferable that the amount of the fine particles is in the range of 20 to 150 parts and more preferably in the range of 30 to 120 parts by weight.

The coating fluid for forming the hard coat layer used in the present invention can be prepared by adding into a suitable solvent the compound curable by irradiation by an ionizing radiation, the silica particles, the fine particles and various additives used where desired such as antioxidants, ultraviolet light absorbents, light stabilizers, leveling agents and defoaming agents in each specific amount and dissolving or dispersing the added components in the solvent.

Examples of the solvent used in the above preparation include aliphatic hydrocarbons such as hexane, heptane and cyclohexane, aromatic hydrocarbons such as toluene and xylene, halogenated hydrocarbons such as methylene chloride and ethylene chloride, alcohols such as methanol, ethanol, propanol and butanol, ketones such as acetone, methyl ethyl ketone, 2-pentanone and isophorone, esters such as ethyl acetate and butyl acetate and cellosolve solvents such as ethylcellosolve.

The concentration and the viscosity of the coating fluid thus prepared is not particularly limited as long as the coating fluid can be used for coating. The concentration and the viscosity can be suitably selected in accordance with the situation.

The prepared coating fluid is applied on one face of the base film in accordance with a conventional process such as the bar coating process, the knife coating process, the roll coating process, the blade coating process, the die coating process and the gravure coating process and a coating layer is formed. The formed coating layer is dried and cured by irradiation by an ionizing radiation and a hard coat is formed.

Examples of the ionizing radiation include ultraviolet light and electron beams. The ultraviolet light can be obtained by using a high voltage mercury lamp, a fusion H lamp or a xenon lamp and, in general, the amount of the irradiation is 100 to 500 mJ/cm$^2$. The electron beams can be obtained by using an electron beam accelerator and, in general, the amount of the irradiation is 150 to 350 kV. Among these ionizing radiations, ultraviolet light is preferable. When the electron beams are used, a cured film can be obtained without adding polymerization initiators.

It is preferable that the hard coat layer thus formed has a thickness in the range of 0.5 to 20 μm. When the thickness is smaller than 0.5 μm, there is the possibility that scratch resistance of the hard coat film is not sufficiently exhibited. When the thickness exceeds 20 μm, there is the possibility that 60° gloss becomes great. From the standpoint of the scratch resistance and the 60° gloss, it is preferable that the thickness of the hard coat layer is in the range of 1 to 15 μm and more preferably in the range of 2 to 10 μm.

The haze and the 60° gloss indicate the anti-glare property of the very fine anti-glare hard coat film of the present invention. It is necessary that the haze is 3% or greater and it is preferable that the 60° gloss is 100 or smaller. When the haze is smaller than 3%, a sufficient anti-glare property is not exhibited. When the 60° gloss exceeds 100, the gloss of the surface is great, i.e., reflection of light is great, and the anti-glare property is adversely affected. A very great haze is not preferable since the light transmittance decreases. It is preferable that the clarity of vision through is 100 or greater. The clarity of vision through indicates the quality of displayed images, i.e., the visibility. When the clarity of vision through is smaller than 100, a sufficiently excellent quality of displayed images, i.e., a sufficient visibility, cannot be obtained. It is preferable that the total light transmittance is 70% or greater. When the total light transmittance is smaller than 70%, there is the possibility that the transparency is insufficient.

From the standpoint of the balance between the anti-glare property, the quality of displayed images, i.e., the visibility, the light transmittance and the transparency, it is preferable that the haze is in the range of 3 to 40% and more preferably in the range of 5 to 30%, the 60° gloss is 90 or smaller and more preferably in the range of 50 to 85, the clarity of vision through is 150 or greater and more preferably in the range of 200 to 300, and the total light transmittance is 75% or greater and more preferably in the range of 80 to 95%. The methods of measurements of these optical properties will be described in EXAMPLES.

It is preferable that the hard coat layer of the very fine anti-glare hard coat film of the present invention has a pencil hardness of H or greater. When the pencil hardness is H or greater, the scratch resistance necessary for the hard coat film is sufficiently exhibited. To exhibit still more excellent scratch resistance, it is preferable that the pencil hardness is 2 H or greater. The method of measurement of the pencil hardness will be described in EXAMPLES.

In the present invention, where necessary, a layer for preventing reflection such as a coating film of a siloxane resin and a coating film of fluororesin can be disposed on the surface of the hard coat layer so that the hard coat film is provided with the property of preventing reflection. It is suitable that the thickness of the layer for preventing reflection is about 0.05 to 1 µm. By disposing the layer for preventing reflection, formation of unnecessary images on the display caused by reflection of light from sunlight or fluorescent light can be prevented. By suppressing the reflectivity at the surface, the total light transmittance can be increased and the transparency can be improved. When a suitable type of the layer for preventing reflection is used, the antistatic property can also be improved. The method of measurement of the reflectivity will be described in EXAMPLES.

In the very fine anti-glare hard coat film of the present invention, an adhesive layer for attaching the film to an adherend such as a liquid crystal display may be formed on the face of the base film opposite to the face on which the hard coat layer is disposed. As the adhesive constituting the adhesive layer, an adhesive for optical applications such as an acrylic adhesive, a urethane adhesive and a silicone adhesive is preferably used. The thickness of the adhesive layer is, in general, in the range of 5 to 100 µm and preferably in the range of 10 to 60 µm.

A release film may be disposed on the adhesive layer. Examples of the release film include paper such as glassine paper, coated paper and laminated paper and various types of plastic film, which are coated with release agents such as silicone resins. The thickness of the release film is not particularly limited. In general, the thickness is in the range of about 20 to 150 µm.

To summarize the advantages of the present invention, the very fine anti-glare hard coat film of the present invention provides excellent visibility when the film is used for various types of displays since the film provides an excellent anti-glare property to the displays such as very fine liquid crystal displays without deterioration in the quality of displayed images and can also be used as a film for protecting surfaces since the film has a great surface hardness.

EXAMPLES

The present invention will be described more specifically with reference to examples in the following. However, the present invention is not limited to the examples.

The properties of an anti-glare hard coat film were evaluated in accordance with the following methods.
(1) Total Light Transmittance and Haze The total light transmittance and the haze were measured in accordance with the method of Japanese Industrial Standard K6714 using a haze meter produced by NIPPON DENSHOKU KOGYO Co., Ltd.
(2) 60° Gloss The 60° gloss was measured in accordance with the method of Japanese Industrial Standard K7105 using a gloss meter produced by NIPPON DENSHOKU KOGYO Co., Ltd.
(3) Clarity of Vision Through The clarity of vision through was measured in accordance with the method of Japanese Industrial Standard K7105 using an apparatus for measuring the image forming property produced by SUGA TEST INSTRUMENTS Co., Ltd. The sum of the values obtained in the measurements using four optical comb widths (0.125 mm, 0.5 mm, 1.0 mm and 2.0 mm) was used as the clarity of vision through.
(4) Pencil Hardness The pencil hardness was measured by hand writing in accordance with the method of Japanese Industrial Standard K5400.
(5) Scratch Resistance The surface of a coated layer of a hard coat film was rubbed with steel wool #0000 and the condition of the surface was visually observed. When no scratches were found on the surface, the result was evaluated as good. When scratches were found on the surface, the result was evaluated as poor.
(6) Reflectivity The reflectivity of light having a wavelength of 600 nm at the surface of a hard coat film was measured using a spectrophotometer for ultraviolet light and visible light "UV-3101PC" manufactured by SHIMADZU CORPORATION.

Example 1

Pentaerythritol triacrylate [manufactured by TOAGOSEI Co., Ltd.; ARONIX M-305] in an amount of 100.0 parts by weight, 3.0 parts by weight of silica gel powder having an average diameter of 1.6 µm [manufactured by FUJI SILYSIA CHEMICAL, Ltd.; SYLYSIA 320], 5.0 parts by weight of a photopolymerization initiator 1-hydroxycyclohexyl phenyl ketone [manufactured by Ciba Specialty Chemicals K. K.; IRGACURE 184], 120.2 parts by weight of a zinc antimonate sol having an average diameter of 15 nm [manufactured by NISSAN CHEMICAL INDUSTRIES, Ltd.; CELNAX CX-Z610M-FA; the solvent: methanol; the concentration of solid components: 60% by weight] and 132.0 parts by weight of isobutyl alcohol were uniformly mixed and a coating fluid for forming a hard coat layer having a concentration of solid components of about 50% by weight was prepared.

A surface of a polyethylene terephthalate film having a thickness of 188 µm [manufactured by TOYOBO Co., Ltd.;

A4300] was coated with the above coating fluid using a Mayer bar in a manner such that a cured film having a thickness of 6 μm was formed. The coated film was irradiated by ultraviolet light of 250 mJ/cm² using a high voltage mercury lamp and an anti-glare hard coat film was prepared.

The results of evaluation of the properties of the prepared hard coat film are shown in Table 1.

Example 2

Pentaerythritol triacrylate [manufactured by TOAGOSEI Co., Ltd.; ARONIX M-305] in an amount of 100.0 parts by weight, 5.0 parts by weight of silica gel powder having an average diameter of 1.6 μm [manufactured by FUJI SILYSIA CHEMICAL, Ltd.; SYLYSIA 320], 5.0 parts by weight of a photopolymerization initiator 1-hydroxycyclohexyl phenyl ketone [manufactured by Ciba Specialty Chemicals K. K.; IRGACURE 184], 122.5 parts by weight of a zinc antimonate sol having an average diameter of 15 nm [manufactured by NISSAN CHEMICAL INDUSTRIES, Ltd.; CELNAX CX-Z610M-FA; the solvent: methanol; the concentration of solid components: 60% by weight] and 134.5 parts by weight of isobutyl alcohol were uniformly mixed and a coating fluid for forming a hard coat layer having a concentration of solid components of about 50% by weight was prepared. Then, the same procedures as those conducted in Example 1 were conducted and an anti-glare hard coat film was prepared. The results of evaluation of the properties of the prepared hard coat film are shown in Table 1.

Example 3

Pentaerythritol triacrylate [manufactured by TOAGOSEI Co., Ltd.; ARONIX M-305] in an amount of 100.0 parts by weight, 10.0 parts by weight of silica gel powder having an average diameter of 1.6 μm [manufactured by FUJI SILYSIA CHEMICAL, Ltd.; SYLYSIA 320], 5.0 parts by weight of a photopolymerization initiator 1-hydroxycyclohexyl phenyl ketone [manufactured by Ciba Specialty Chemicals K. K.; IRGACURE 184], 128.0 parts by weight of a zinc antimonate sol having an average diameter of 15 nm [manufactured by NISSAN CHEMICAL INDUSTRIES, Ltd.; CELNAX CX-Z610M-FA; the solvent: methanol; the concentration of solid components: 60% by weight] and 140.6 parts by weight of isobutyl alcohol were uniformly mixed and a coating fluid for forming a hard coat layer having a concentration of solid components of about 50% by weight was prepared. Then, the same procedures as those conducted in Example 1 were conducted and an anti-glare hard coat film was prepared. The results of evaluation of the properties of the prepared hard coat film are shown in Table 1.

Example 4

Pentaerythritol triacrylate [manufactured by TOAGOSEI Co., Ltd.; ARONIX M-305] in an amount of 100.0 parts by weight, 10.0 parts by weight of silica gel powder having an average diameter of 1.6 μm [manufactured by FUJI SILYSIA CHEMICAL, Ltd.; SYLYSIA 320], 5.0 parts by weight of a photopolymerization initiator 1-hydroxycyclohexyl phenyl ketone [manufactured by Ciba Specialty Chemicals K. K.; IRGACURE 184], 154.2 parts by weight of a zinc antimonate sol having an average diameter of 21 nm [manufactured by NISSAN CHEMICAL INDUSTRIES, Ltd.; CELNAX CX-Z210IP; the solvent: isopropyl alcohol; the concentration of solid components: 20% by weight] and 26.8 parts by weight of isopropyl alcohol were uniformly mixed and a coating fluid for forming a hard coat layer having a concentration of solid components of about 50% by weight was prepared. Then, the same procedures as those conducted in Example 1 were conducted and an anti-glare hard coat film was prepared.

The surface of the anti-glare hard coat film opposite to the surface having the hard coat layer was coated with an acrylic adhesive [manufactured by LINTEC Corporation; PU-V] in a manner such that a dried film having a thickness of 20 μm was formed. After the adhesive layer was dried, a release film prepared by treating a polyethylene terephthalate film with a silicone to provide the releasing property was laminated to the adhesive layer and an adhesive sheet was prepared.

The results of evaluation of the properties of the prepared hard coat film are shown in Table 1.

Example 5

The hard coat layer of the anti-glare hard coat film obtained in Example 1 was coated with an agent for preventing reflection containing a siloxane [manufactured by COLCOAT Co., Ltd.; COLCOAT N-103X; the concentration of solid components: 2% by weight] using a Mayer bar in a manner such that the dried layer having a thickness of 0.1 μm was formed. The coating layer was dried at 100° C. for 1 minute and an anti-glare hard coat film was prepared.

The results of evaluation of the properties of the prepared hard coat film are shown in Table 1.

Example 6

Pentaerythritol triacrylate [manufactured by TOAGOSEI Co., Ltd.; ARONIX M-305] in an amount of 100.0 parts by weight, 10.0 parts by weight of silica gel powder having an average diameter of 1.6 μm [manufactured by FUJI SILYSIA CHEMICAL, Ltd.; SYLYSIA 320], 5.0 parts by weight of a photopolymerization initiator 1-hydroxycyclohexyl phenyl ketone [manufactured by Ciba Specialty Chemicals K. K.; IRGACURE 184], 183.3 parts by weight of colloidal silica particles having an average diameter of 10 to 20 nm [manufactured by CATALYSTS & CHEMICALS IND. Co., Ltd.; OSCAL 1632; the solvent: ethylcellosolve; the concentration of solid components: 30% by weight] and 41.7 parts by weight of ethylcellosolve were uniformly mixed and a coating fluid for forming a hard coat layer having a concentration of solid components of about 50% by weight was prepared. Then, the same procedures as those conducted in Example 1 were conducted and an anti-glare hard coat film was prepared. The results of evaluation of the properties of the prepared hard coat film are shown in Table 1.

Comparative Example 1

Pentaerythritol triacrylate [manufactured by TOAGOSEI Co., Ltd.; ARONIX M-305] in an amount of 100.0 parts by weight, 10.0 parts by weight of silica gel powder having an average diameter of 1.6 μm [manufactured by FUJI SILYSIA CHEMICAL, Ltd.; SYLYSIA 320], 5.0 parts by weight of a photopolymerization initiator 1-hydroxycyclohexyl phenyl ketone [manufactured by Ciba Specialty Chemicals K. K.; IRGACURE 184] and 57.5 parts by weight of isobutyl alcohol were uniformly mixed and a coating fluid for forming a hard coat layer having a concentration of solid components of about 50% by weight was prepared. Then, the same procedures as those conducted in Example 1 were conducted and an anti-glare hard coat film was prepared. The results of evaluation of the properties of the prepared hard coat film are shown in Table 2.

Comparative Example 2

Pentaerythritol triacrylate [manufactured by TOAGOSEI Co., Ltd.; ARONIX M-305] in an amount of 100.0 parts by weight, 5.0 parts by weight of a photopolymerization initiator 1-hydroxycyclohexyl phenyl ketone [manufactured by Ciba Specialty Chemicals K. K.; IRGACURE 184], 116.7 parts by weight of a zinc antimonate sol having an average diameter of 15 nm [manufactured by NISSAN CHEMICAL INDUSTRIES, Ltd.; CELNAX CX-Z610M-FA; the solvent: methanol; the concentration of solid components: 60% by weight] and 128.3 parts by weight of isobutyl alcohol were uniformly mixed and a coating fluid for forming a hard coat layer having a concentration of solid components of about 50% by weight was prepared. Then, the same procedures as those conducted in Example 1 were conducted and an anti-glare hard coat film was prepared. The results of evaluation of the properties of the prepared hard coat film are shown in Table 2.

TABLE 1

|  | Example |  |  |  |  |  |
| --- | --- | --- | --- | --- | --- | --- |
|  | 1 | 2 | 3 | 4 | 5 | 6 |
| Haze (%) | 11.87 | 16.76 | 23.76 | 17.81 | 10.78 | 8.85 |
| Total light transmittance (%) | 84.17 | 82.82 | 80.90 | 81.85 | 86.34 | 90.60 |
| 60° Gloss | 84.3 | 69.7 | 62.0 | 69.7 | 79.3 | 79.9 |
| Clarity of vision through | 253.1 | 244.6 | 241.2 | 224.3 | 258.4 | 260.3 |
| Pencil hardness | 3H | 3H | 3H | 3H | 3H | 3H |
| Scratch resistance | good | good | good | good | good | good |
| Reflectivity (%) | 6.4 | 6.2 | 6.3 | 6.3 | 3.8 | 6.5 |

TABLE 2

|  | Comparative Example |  |
| --- | --- | --- |
|  | 1 | 2 |
| Haze (%) | 7.10 | 1.60 |
| Total light transmittance (%) | 88.21 | 80.62 |
| 60° Gloss | 116.6 | 146.1 |
| Clarity of vision through | 51.5 | 230.6 |
| Pencil hardness | 3H | 2H |
| Scratch resistance | good | good |
| Reflectivity (%) | 7.0 | 7.1 |

What is claimed is:

1. A very fine anti-glare hard coat film which comprises a base film and a hard coat layer disposed on the base film and has a haze of 3% to 40%, a 60° gloss of 90 or smaller, a total light transmittance of 75 to 95% and a clarity of vision through of 150 or greater, wherein the hard coat layer comprises (A) a resin cured by an ionizing radiation and, per 100 parts by weight of the resin, 2 to 25 parts by weight of (B) silica particles having an average diameter of 0.8 to 4 $\mu$m and 10 to 200 parts by weight of (C) fine particles having an average diameter of 1 to 60 nm.

2. A film according to claim 1, which comprises a layer for preventing reflection disposed on the hard coat layer.

3. A film according to claim 1, which comprises an adhesive layer disposed on a face of the base film opposite to a face on which the hard coat layer is disposed.

4. A film according to claim 2, which further comprises an adhesive layer disposed on a face of the base film opposite to a face on which the hard coat layer is disposed.

5. A film according to claim 1 wherein the fine particles (C) are particles of zinc antimonate.

6. A film according to claim 5, which comprises a layer for preventing reflection disposed on the hard coat layer.

7. A film according to claim 5, which comprises an adhesive layer disposed on a face of the base film opposite to a face on which the hard coat layer is disposed.

8. A film according to claim 6, which further comprises an adhesive layer disposed on a face of the base film opposite to a face on which the hard coat layer is disposed.

9. A film according to claim 1, wherein the base film is a film of polyethylene terephthalate, the resin (A) is a cured resin of pentaerythritol triacrylate by irradiation of ultraviolet light, the silica particles (B) are a powder of silica gel having an average particle diameter of 1 to 3 $\mu$m, and the fine particles (C) are a colloidal silica.

10. A film according to claim 9, which comprises a layer for preventing reflection disposed on the hard coat layer.

11. A film according to claim 9, which comprises an adhesive layer disposed on a face of the base film opposite to a face on which the hard coat layer is disposed.

12. A film according to claim 10, which further comprises an adhesive layer disposed on a face of the base film opposite to a face on which the hard coat layer is disposed.

13. A film according to claim 5, wherein the base film is a film of polyethylene terephthalate, the resin (A) is a cured resin of pentaerythritol triacrylate by irradiation of ultraviolet light, the silica particles (B) are a powder of silica gel having an average particle diameter of 1 to 3 $\mu$m.

14. A film according to claim 13, which comprises a layer for preventing reflection disposed on the hard coat layer.

15. A film according to claim 13, which comprises an adhesive layer disposed on a face of the base film opposite to a face on which the hard coat layer is disposed.

16. A film according to claim 14, which further comprises an adhesive layer disposed on a face of the base film opposite to a face on which the hard coat layer is disposed.

* * * * *

UNITED STATES PATENT AND TRADEMARK OFFICE
CERTIFICATE OF CORRECTION

PATENT NO. : 6,613,426 B2
DATED : September 2, 2003
INVENTOR(S) : Yutaka Onozawa et al.

It is certified that error appears in the above-identified patent and that said Letters Patent is hereby corrected as shown below:

<u>Column 11,</u>
Line 49, replace "A very fine" with -- An --;
Line 51, replace "smaller" with -- less --.

Signed and Sealed this

Second Day of August, 2005

JON W. DUDAS
*Director of the United States Patent and Trademark Office*